United States Patent Office

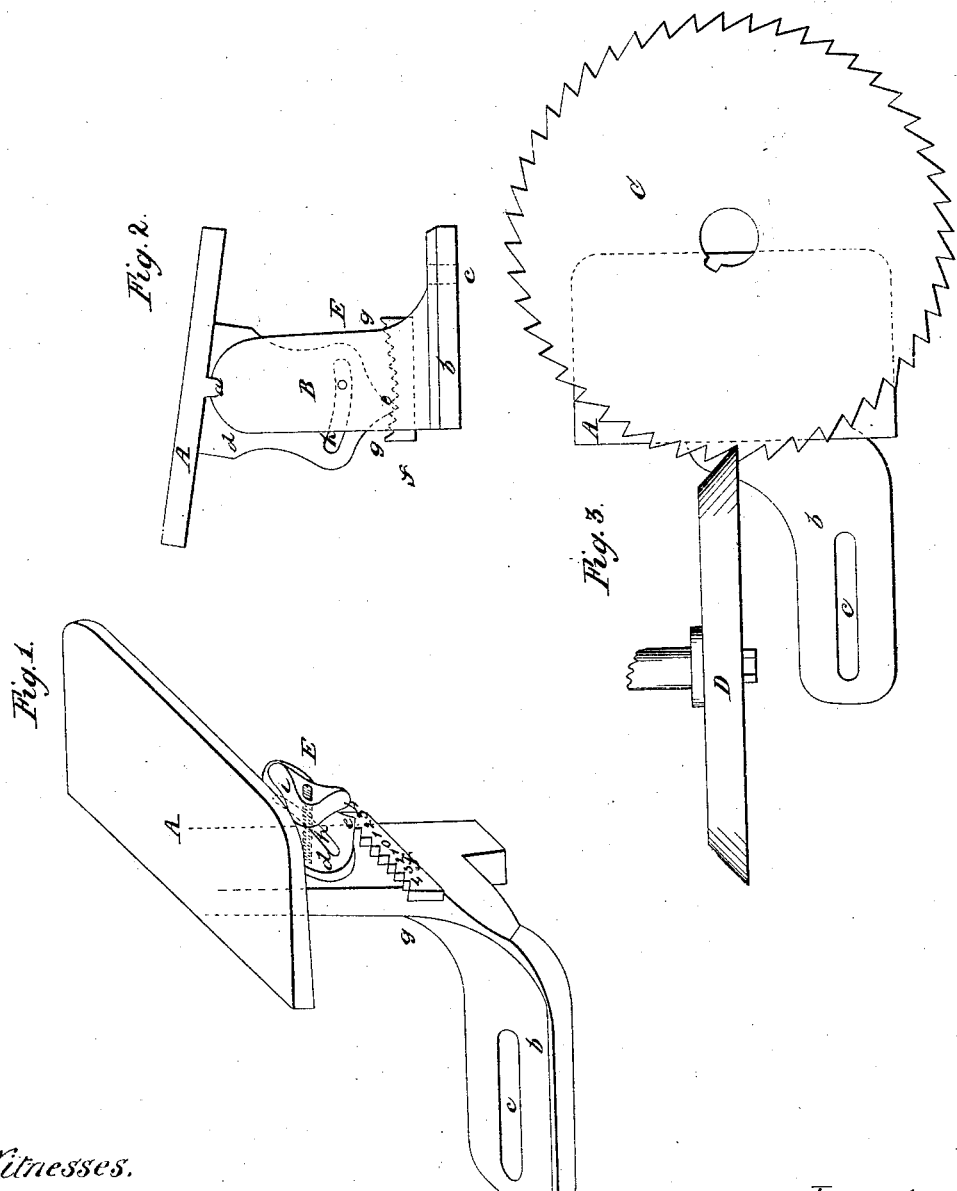

JOSEPH F. TUDER, OF PHILADELPHIA, PENNSYLVANIA.

Letters Patent No. 62,705, dated March 5, 1867.

IMPROVEMENT IN RESTS FOR SHARPENING SAWS.

*The Schedule referred to in these Letters Patent and making part of the same.*

TO ALL WHOM IT MAY CONCERN:

Be it known that I, JOSEPH F. TUDER, of the city and county of Philadelphia, and State of Pennsylvania, have invented a new and useful Improvement in Rests for Sharpening Saws; and I do hereby declare that the following is a full and exact description thereof, reference being had to the accompanying drawings and to the letters of reference marked hereon.

The nature of my invention consists, in the first place, of a reversible saw rest provided with a swivel-joint near its face for the purpose of adjusting the saw so as to be accurately sharpened with bevels to the edges of the teeth contrariwise; secondly, in combining the rest with a rack by means of a permanent catch projecting from the under side of the rest-plate in such a manner as to effect sharpening the teeth at each side of the saw with corresponding angles, the rest also being readily adjusted to a horizontal position for sharpening the teeth with square edges when required. The rest is peculiarly adapted to my machine for sharpening saws, patented July 25, 1865, but may be used advantageously in connection with other machines for the same purpose. The construction and operation of the rest will be understood by the following description. In the accompanying drawings—

Figure 1 is a perspective view of the improved rest.

Figure 2 is a side elevation of do.

Figure 3 is a plan of the arrangement of the saw with the rest, and an emery-wheel for sharpening the teeth of the latter.

Like letters in all the figures indicate the same parts.

A is a reversible rest-plate for holding either a circular or straight saw to be sharpened. It has an open joint, $a$, which connects it with the top of the standard B, whose foot-piece, $b$, has a longitudinal slot, $c$, for the purpose of confining it on a rest-plate attached to a bench, with which an emery-wheel is connected for sharpening the teeth of the saws. The plate A has a permanent arm, $d$, projecting from its under side and terminating with a catch, $e$, for connecting it with the permanent rack, $f$, on the face of the standard B, for the adjustment of the plate in a horizontal position for sharpening the teeth with square edges, or on angles, right and left, for making them angular or bevelled, when required. In order to the expeditious adjustment of the rest, so as to sharpen the teeth at each side of the saw precisely alike, the notches $g$ of the rack are numbered, right and left, from the vertical notch $o$. The catch is placed in the notch $o$ for bringing the plate A horizontally, for giving square edges to the teeth, and to one side, as seen in figs. 1 and 2, for giving bevelled edges. When so set, every other notch of the saw C, as seen in fig. 3, is brought in succession to the emery-wheel D, for sharpening the teeth at one side of the saw; and then the rest is reversed for sharpening on the other side by placing the catch $e$ in the corresponding notch at the other end of the rack. In the arm $d$ there is a slot, $h$, concentric with the joint $a$, through which a screw, E, passes, which is confined in the standard B, there being a nut, $i$, for confining the arm to the standard, to give stability to the rest-plate. In fig. 3 the flat part of the emery-wheel is represented as bearing against the front edge of a tooth, and the angular edge removed from the root of the next tooth. As the emery-wheel is made to revolve with great rapidity, the edge is instantly sharpened, and the saw is slightly turned around so as to bring the back edge of the next tooth into connection with the bevel edge of the wheel. Both edges may be sharpened, however, at one operation, by having the bevel of the wheel to correspond to the serrations which form the teeth of the saws. In reversing the rest-plate A, after slacking the nut $i$, the plate is slightly raised, so as to bring the catch $e$ out of connection with the rack $f$, the open joint $a$ affording facility thereto. Instead of having an open joint there may be an elongated hole for the bearing of the joint-pin, which will answer the same purpose.

What I claim as my invention, and desire to secure by Letters Patent, is—

1. Combining the rest-plate A with the standard B, by means of the joint $a$, at or near the plate, substantially as above described, and for the purpose specified.

2. The combination of the rack $f$, on the standard B, with the rest-plate A, substantially as and for the purpose set forth.

In testimony that the above is my invention, I have hereunto set my hand and affixed my seal, this 23d day of January, 1867.

JOS. F. TUDER. [L. S.]

Witnesses:
STEPHEN USTICK,
JOHN WHITE.